US012719292B2

(12) United States Patent
Dvorský et al.

(10) Patent No.: US 12,719,292 B2
(45) Date of Patent: Aug. 25, 2026

(54) METHOD OF CHARGING A BATTERY FROM A PHOTOVOLTAIC PANEL

(71) Applicant: MGM COMPRO S.R.O, Zlin (CZ)

(72) Inventors: Grigorij Dvorský, Zlin (CZ); Martin Dvorský, Zlin (CZ)

(73) Assignee: MGM COMPRO S.R.O, Zlin (CZ)

( * ) Notice: Subject to any disclaimer, the term of this patent is extended or adjusted under 35 U.S.C. 154(b) by 773 days.

(21) Appl. No.: 18/015,349

(22) PCT Filed: Jun. 21, 2021

(86) PCT No.: PCT/CZ2021/050067
§ 371 (c)(1),
(2) Date: Jan. 10, 2023

(87) PCT Pub. No.: WO2022/022758
PCT Pub. Date: Feb. 3, 2022

(65) Prior Publication Data

US 2023/0283100 A1 Sep. 7, 2023

(30) Foreign Application Priority Data

Jul. 27, 2020 (CZ) ................................ CZ2020-427

(51) Int. Cl.
*H01M 10/44* (2006.01)
*H02J 7/35* (2006.01)
*H02J 7/96* (2026.01)
*H02J 101/24* (2026.01)

(52) U.S. Cl.
CPC ..................................... *H02J 7/35* (2013.01); *H02J 7/96* (2026.01); *H02J 2101/25* (2026.01)

(58) Field of Classification Search
None
See application file for complete search history.

(56) References Cited

U.S. PATENT DOCUMENTS

2011/0062913 A1 * 3/2011 Lin ....................... H02J 7/1415 320/101

* cited by examiner

*Primary Examiner* — Arun C Williams
(74) *Attorney, Agent, or Firm* — Rivka Friedman

(57) ABSTRACT

A method of charging at least one accumulator battery (4) from at least one photovoltaic panel (1, 2). The photovoltaic panel (1, 2) generates an instantaneous electrical power ($P_{\Delta t}$), at each point in time (Δt), which is transformed into a charging current in the converter (6) connected to the photovoltaic panel (1, 2). This charging current is transmitted via a DC power line (3) to at least one accumulator battery (4). According to this method, the values of the instantaneous electrical power ($P_{\Delta t}$) of the photovoltaic panel (1, 2) and the maximum possible charging voltage ($U_{bat.}$) of the accumulator battery (4) are continuously monitored at each point in time (Δt). The instantaneous electrical power ($P_{\Delta t}$) of the photovoltaic panel (1, 2) is then continuously transformed to the optimal charging current ($I_{opt.}$) at each point in time (Δt) to be maximal and to meet the conditions $$I_{opt.} = \frac{P_{\Delta t}}{U_{bat.}}$$

and concurrently $I_{opt.} \leq I_{max.}$.

4 Claims, 3 Drawing Sheets

METHOD OF CHARGING A BATTERY FROM A PHOTOVOLTAIC PANEL

FIELD OF THE INVENTION

A method of charging a battery from a photovoltaic panel relates to the field of application of clean sources of electricity, in this case on the basis of obtaining electricity by means of photovoltaic cells and a method of using it for recharging batteries.

BACKGROUND OF THE INVENTION

One of the methods of obtaining green electricity is to use the light of the sun and convert light energy into electrical energy. The electrical energy generated in this way is supplied to the appliance or to the accumulator battery by means of electrical distribution system. To supply common household electrical appliances with alternating current, it is necessary to add an inverter that converts direct current energy to alternating voltage with a magnitude and frequency identical to the distribution system.

Charging the accumulator battery from a photovoltaic panel in a simple circuit, where the photovoltaic panel and the accumulator battery are connected directly or via a separating diode, is only possible in special cases when the charging voltage of the accumulator battery is slightly lower than the optimal operating voltage of the photovoltaic panel and individual accumulator battery cells are resistant to overcharging, e.g. in nickel-cadmium (NiCd) accumulator batteries with submerged electrodes. Conventional modern systems allowing to maximize the power supplied by the photovoltaic panel of electricity and prevent overcharging of the accumulator battery cells are equipped on the photovoltaic panel side with a maximum power monitor and individual cells of the accumulator battery are equipped with balancers that prevent them from overcharging. Photovoltaic panel and accumulator battery cells are interconnected via a controllable converter, allowing to transform the power supplied to its input from the photovoltaic panel at a certain voltage to the output, where the output power is taken at a voltage corresponding to the charging of the accumulator battery. The voltage and current levels in the input circuit of the controllable converter are controlled by the maximum power monitor so that the photovoltaic panel delivers maximum power, given the current conditions of its operation.

The most common method for adjusting the magnitude of current and eliminating its fluctuations is the use of converters based on DC/AC and DC/DC transformers, i.e. a unit converting direct current (DC) to alternating current (AC) or a unit converting the parameters of direct current to another direct current. Examples of such devices are devices according to document CN 106786729. It is a device for converting current and storing energy and a method for controlling energy flows. The current conversion and energy storage device comprises a bidirectional DC/AC converter unit for an accumulator battery, a bidirectional DC/AC converter unit for a supercapacitor, control units, energy management device and individual photovoltaic units in the form of photovoltaic panels. The control units are designed for charging and discharging the accumulator battery, for charging and discharging the supercapacitor and for controlling the current load. The balance of system power fluctuations is achieved by shifting the peak load according to the state of energy flow of the system using a single-phase inverter. The device has less power switching devices, thus achieving lower energy losses during switching and high quality of power output. The disadvantage of this device is, despite its relative simplicity, the use of DC/AC and AC/DC conversion systems, which brings considerable energy losses in the system.

For the purposes of this application, an electrical appliance is any electrical device which, for its operation, requires electrical energy of an unspecified magnitude of voltage or current, and thus power, and an unspecified phase, with this electrical device consuming the supplied electrical power for its operation.

For the purposes of this application, a battery or accumulator battery is considered to be any source of electrical energy capable of long-term storage of electrical energy in the form of chemical reaction of two or more substances or elements. In addition, the battery usually has several interconnected cells.

Microprocessors are preferably used to control the power modulations, to sense the signals from the photovoltaic source as well as information from the batteries or circuits, as presented in document FR 2485827. The main disadvantage of this solution is its relative complexity and energy losses, when the microprocessor replaced larger groups of electrical components, but the control process does not change in any way.

Document CZ 308050 describes a device for charging accumulator batteries from a photovoltaic generator formed by photovoltaic panels, in which each charged cell of the accumulator battery has its own controllable converter, whose power inputs are connected to the output of the photovoltaic generator. Control circuits connected to voltage and current sensors sensing the charging voltage and current of the accumulator battery cells are connected to the control ports of the controllable inverters. The control circuits are also connected to the output of the charger control circuit formed by the output of DC amplifier, which is connected to the network from the resistors, and which compares the current voltage at the output of the photovoltaic generator with the control voltage. This voltage is generated as the sum of the temperature component of voltage generated by voltage drop across the silicon diodes of the sensor. The silicon diodes are arranged on the photovoltaic panels of the photovoltaic generator and are connected to a constant current source, to a corrective DC amplifier with a feedback resistance divider with resistors and to a compensating bias source. The current components of voltage on the non-linear load, formed by the parallel connection of two resistors in series with the reference diode, are connected to a sensing photovoltaic panel, which is positioned so that its light level is the same as for photovoltaic panels of the photovoltaic generator. The main disadvantage of this solution is that the principle of its operation is based on the principle of management of the distribution of output adjusted currents into individual cells of the recharged accumulator battery, which is substantially substituting the operation of a standard battery management system (BMS). It is therefore necessary to sense in duplicate the parameters and state of the individual cells of the accumulator battery, which results in greater complexity and a larger number of components and wires used between the accumulator and this device. As assumed, accumulator batteries are of different health and the resulting current charge and current charging ability. However, this system works with a photovoltaic panel, or its group incorporated into a photovoltaic generator, with the same parameters as one unit, i.e. it does not allow optimal use of the system of photovoltaic panels of different sizes and output parameters, or assemblies of variously lit photovoltaic panels, etc.

The power of the photovoltaic panel is given in Watt-peak (Wp). It is the nominal power of the photovoltaic panel in laboratory, i.e. ideal lighting conditions. The Standard Test Conditions (STC) are such that the energy is perpendicularly incident on the photovoltaic panel and has a value of E=1 kW/$m^2$, an atmospheric transparency Am=1.5 and a cell temperature T=25° C. The output power of the photovoltaic system consisting of several photovoltaic panels thus depends on the intensity of solar radiation and other circumstances. More solar radiation means higher power output of the photovoltaic panel. Losses can be caused by non-ideal orientation of the module, high temperature, poor performance of the module, contamination, and DC to AC conversion.

The objective of the present invention is to provide a method of charging an accumulator battery from a photovoltaic panel which is based only on the principle of management of the output current from the photovoltaic panel, which allows easy connection of several photovoltaic panels to one DC bus of the accumulator battery. It will not be critical for this method of charging the accumulator battery from the photovoltaic panel how many photovoltaic panels are connected to the system, and even what are the output parameters. Therefore, the method will not deal with the detailed state of individual battery cells of the accumulator battery, but only the needs of charging current of the accumulator battery as a whole, while further distribution of currents in the accumulator battery is already controlled by the control system of the accumulator battery, which is currently available in the matrix in every smart accumulator battery. This method will always ensure the optimal charging current according to the requirement of accumulator battery to be charged, without the parameters of any connected photovoltaic panel or their combination being critical.

SUMMARY OF THE INVENTION

The disadvantages of the known methods of charging accumulator batteries from a photovoltaic panel are eliminated by this method of charging at least one accumulator battery from at least one photovoltaic panel. According to this method, the photovoltaic panel generates a changing electrical power, the magnitude of which depends mainly on the type and power design parameters of the photovoltaic panel, as well as on the intensity of the incident solar radiation. It can be said that the electrical power of the photovoltaic panel changes over time. Therefore, the photovoltaic panel generates an instantaneous electrical power at each point in time. This instantaneous electrical power is converted into charging current in the converter. The charging current is transmitted to the at least one accumulator battery to be charged through an electric direct current transmission line. This current charges the accumulator battery. At the same time, the values of the instantaneous electrical power of the photovoltaic panel and the maximum possible charging voltage of the accumulator battery are continuously monitored at each point in time. At the same time, the instantaneous electrical power of the photovoltaic panel is continuously transformed at each point in time into the optimal charging current according to the equation $$I_{opt.} = \frac{P_{\Delta t}}{U_{bat.}}.$$

This optimal charging current is used directly to charge the accumulator battery. At the same time, the instantaneous electrical power of the photovoltaic panel is continuously adjusted at each point in time to be maximal. At the same time, the adjusted instantaneous electrical power is continuously transformed into the optimal charging current not exceeding the value of the instantaneous maximal permissible charging current. The optimal charging current must meet the conditions that:

$$I_{opt.} = \frac{P_{\Delta t}}{U_{bat.}}$$

and concurrently $I_{opt.} \leq I_{max.}$. The instantaneous maximal permissible charging current is the current that the accumulator battery can safely absorb at the moment during its charging cycle.

In a preferred embodiment, at least two photovoltaic panels form a system of photovoltaic panels that continuously generate two instantaneous electrical powers at each point in time. These two instantaneous electrical powers add up to the instantaneous electrical power of the system. In this preferred embodiment, the transformed optimal charging current is obtained by transforming the sum of these instantaneous electrical powers according to the formula $$I_{opt.} = \frac{P1_{\Delta t} + P2_{\Delta t}}{U_{bat.}} = \frac{P_s}{U_{bat.}}.$$

In another preferred embodiment, several photovoltaic panels of identical or different design performance form a system of photovoltaic panels consisting of "i" number of photovoltaic panels. In this way, the system of photovoltaic panels continuously generates the instantaneous electrical power of the system at each point in time according to the formula $$P_s = \sum_{i=1}^{n} Pi_{\Delta t}.$$

According to this preferred embodiment, the transformed optimal charging current is obtained from the equation $$I_{opt.} = \frac{\sum_{i=1}^{n} Pi_{\Delta t}}{U_{bat.}} = \frac{P_s}{U_{bat.}}.$$

The main advantages of the method of charging a battery from a photovoltaic panel according to the invention are in the simplification of the principle of management of output charging current. This makes it easy to connect several photovoltaic panels to a single DC bus of the charging battery. It is not important for this method of charging the battery from the photovoltaic panel how many photovoltaic panels are connected to the system, or what design or current light power parameters the individual photovoltaic panels have. The method is not based on monitoring the detailed condition of battery cells, but only on monitoring the needs of charging current of the battery as a whole. The distribution of currents to the individual cells in the battery is already controlled by the control system of the battery. Therefore, this method always ensures the optimal charging current according to the requirement of the accumulator battery to be charged, without the parameters of any connected photovoltaic panel or their system being critical.

EXPLANATION OF DRAWINGS

The invention will be explained in detail by drawings which illustrate.

EXAMPLES OF THE INVENTION EMBODIMENTS

The following examples are only part of possible exemplary embodiments of the invention, and therefore cannot be construed as limiting the scope of possible embodiments of the invention in any way. Those skilled in the art will certainly find other embodiments of the invention which are not set forth herein but are based on the claims referred to in.

Figure 1:
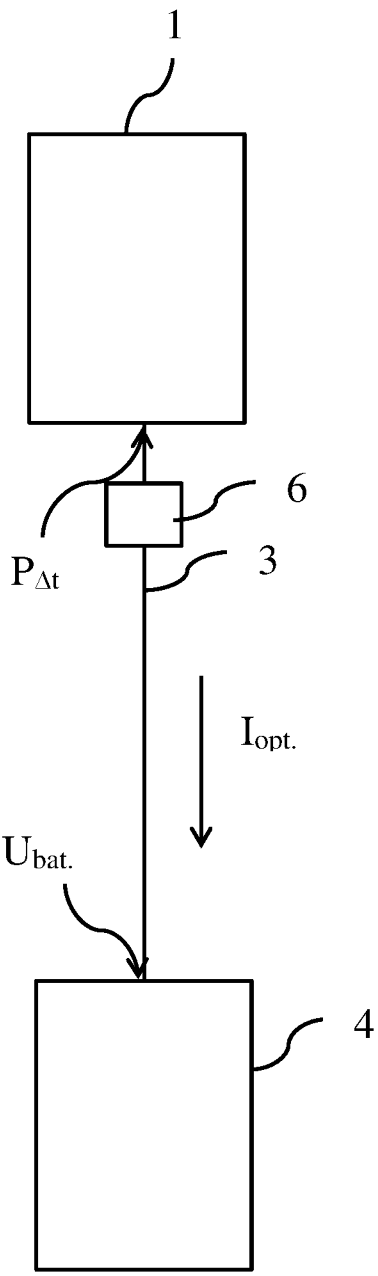
FIG. 1 a schematic illustration of a method of charging an accumulator battery when a single photovoltaic panel is connected.
Figure 2:
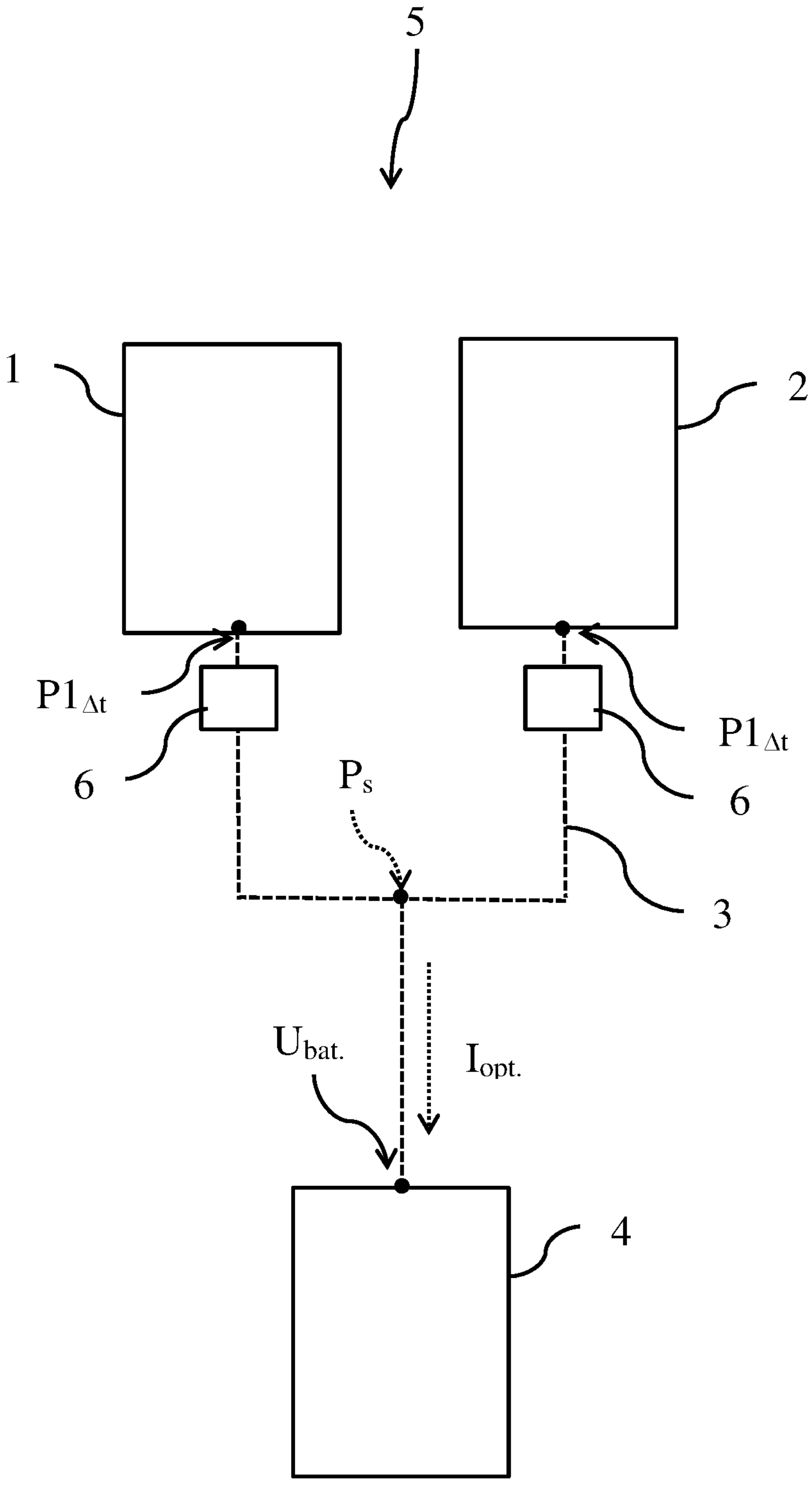
FIG. 2 a schematic illustration of a method of charging an accumulator battery when a system of two photovoltaic panels emitting the same instantaneous electrical power at the same time is connected.

As shown in FIGS. 1 and 2, the present invention describes a method of charging at least one accumulator battery 4 from at least one photovoltaic panel 1, 2. The installed photovoltaic panel 1, 2 according to this method generates a changing electrical power, the magnitude of which depends mainly on the type and power design parameters of the photovoltaic panel 1, 2, as well as on the intensity of the incident solar radiation. The electrical power of the photovoltaic panel 1, 2 is thus a variable that changes over time. At each point in time instant Δt, the instantaneous electrical power $P_{\Delta t}$ is generated by the photovoltaic panel 1, 2. This generated instantaneous electrical power $P_{\Delta t}$ is transformed in the converter 6 into a charging current, which is transmitted by an electric direct current line 3 for the transmission of electric current, to at least one accumulator battery 4. This charging current charges constantly the accumulator battery 4.

To optimize the process of transforming power into charging current, the value of the instantaneous electrical power $P_{\Delta t}$ of the photovoltaic panel 1, 2 and the maximum possible charging voltage $U_{bat.}$ of the accumulator battery 4 is continuously monitored at each point in time Δt. At the same time, the instantaneous electrical power $P_{\Delta t}$ of the photovoltaic panel 1, 2 is continuously transformed to the optimal charging current $I_{opt.}$ at each point in time Δt. The transformation takes place according to the equation $$I_{opt.} = \frac{P_{\Delta t}}{U_{bat.}}.$$

This optimal charging current $I_{opt.}$ is used to charge the accumulator battery 4 with charging voltage $U_{bat.}$ the same time, the instantaneous electrical power $P_{\Delta t}$ of the photovoltaic panel 1, 2 is continuously adjusted at each point in time Δt to be maximal. At the same time, the adjusted instantaneous electrical power $P_{\Delta t}$ is continuously transformed into the optimal charging current $I_{opt}$, which must not be higher than the instantaneous maximal permissible charging current $I_{max.}$ The optimal charging current $I_{opt.}$ must meet the conditions that:

$$I_{opt.} = \frac{P_{\Delta t}}{U_{bat.}}$$

and concurrently $I_{opt} \leq I_{max.}$. In these cases, the instantaneous maximal permissible charging current $I_{max.}$ is the maximal current that the accumulator battery 4 can safely absorb at point in time Δt during its charging cycle.

According to one non-illustrated exemplary embodiment of the invention generally based on FIG. 1, just one first photovoltaic panel 1 in the SL2-F 135 Wp design with a thin-film CIGS structure is installed and the accumulator battery 4 is in the 48 V LiFePo4 160 Ah design in the 14S1P configuration. At an intensity of illumination of 500 W/m$^2$ and a temperature of the first photovoltaic panel 1 is 50° C., the instantaneous electrical power $P_{\Delta t}$ of the first photovoltaic panel 1 is 56 W, at an output voltage of the first photovoltaic panel 1 with value of 80 V and an output current of the first photovoltaic panel 1 being 0.7 A. The maximal possible charging voltage $U_{bat.}$ of the accumulator battery 4 in this exemplary embodiment of the invention is 46.2 V. With the necessary calculation of 5% of energy losses due to energy transformation, the optimal charging current $I_{opt.}$ with a magnitude of 1.15 A flows into the accumulator battery 4.

According to another non-illustrated exemplary embodiment of the invention generally based on FIG. 1, just one first photovoltaic panel 1 in the SL2-F 135 Wp design with a thin-film CIGS structure is installed and the accumulator battery 4 is in the 24 V LiFePo4 160 Ah design in the 7S1P configuration. At an intensity of illumination of 500 W/m$^2$ and a temperature of the first photovoltaic panel 1 is 50° C., the instantaneous electrical power $P_{\Delta t}$ of this photovoltaic panel 1 is 56 W, at an output voltage of this photovoltaic panel 1 with value of 80 V and an output current of this photovoltaic panel 1 being 0.7 A. The maximal possible charging voltage $U_{bat.}$ of the accumulator battery 4 in this exemplary embodiment of the invention is 23.1 V. With the necessary calculation of 5% of losses due to energy transformation, the optimal charging current $I_{opt.}$ with a magnitude of 2.3 A flows into the accumulator battery 4.

According to another non-illustrated exemplary embodiment of the invention generally based on FIG. 1, just one first photovoltaic panel 1 in the SL2-F 135 Wp design with a thin-film CIGS structure is installed and the accumulator battery 4 is in the 48 V LiFePo4 160 Ah design in the 14S1P configuration. At an intensity of illumination of 200 W/m$^2$ and a temperature of the first photovoltaic panel 1 is 25° C., the instantaneous electrical power $P_{\Delta t}$ of this photovoltaic panel 1 is 16 W, at an output voltage of this photovoltaic panel 1 with value of 80 V and an output current of this photovoltaic panel 1 being 0.2 A. The maximal possible charging voltage $U_{bat.}$ of the accumulator battery 4 in this exemplary embodiment of the invention is 46.2 V. With the necessary calculation of 5% of losses due to energy transformation, the optimal charging current $I_{opt.}$ with a magnitude of 0.33 A flows into the accumulator battery 4.

According to following non-illustrated exemplary embodiment of the invention generally based on FIG. 1, just one first photovoltaic panel 1 in the HIT N335 Wp design with a combined structure is installed and the accumulator battery 4 is in the 48 V LiFePo4 160 Ah design in the 14S1P configuration. At an intensity of illumination of 800 W/m$^2$ and a temperature of the first photovoltaic panel 1 is 50° C., the instantaneous electrical power $P_{\Delta t}$ of the photovoltaic panel 1 in question is 258 W, at an output voltage of this photovoltaic panel 1 with value of 55 V and an output current of the same photovoltaic panel 1 being 4.7 A. The maximal possible charging voltage M of the accumulator battery 4 in this exemplary embodiment of the invention is 46.2 V. With the necessary calculation of 5% of losses due to energy transformation, the optimal charging current $I_{opt.}$ With a magnitude of 5.3 A flows into the accumulator battery 4.

According to another non-illustrated exemplary embodiment of the invention generally based on FIG. 1, just one first photovoltaic panel 1 in the HIT N335 Wp design with a combined structure is installed and the accumulator battery 4 is in the 48 V LiFePo4 160 Ah design in the 14S1P configuration. At an intensity of illumination of 400 W/m$^2$ and a temperature of this photovoltaic panel 1 is 50° C., the instantaneous electrical power $P_{\Delta t}$ of the photovoltaic panel 1 in question is 121 W, at an output voltage of the same photovoltaic panel 1 with value of 55 V and an output current of the first photovoltaic panel 1 being 2.2 A. The maximal possible charging voltage $U_{bat.}$ of the accumulator battery 4 in this exemplary embodiment of the invention is 46.2 V. With the necessary calculation of 5% of losses due to energy transformation, the optimal charging current $I_{opt.}$ with a magnitude of 2.49 A flows into the accumulator battery 4.

According to another non-illustrated exemplary embodiment of the invention generally based on FIG. 1, just one first photovoltaic panel 1 in the HIT N335 Wp design with a combined structure is installed and the accumulator battery 4 is in the 24 V LiFePo4 160 Ah design in the 7S1P configuration. At an intensity of illumination of 800 W/m$^2$ and a temperature of the first photovoltaic panel 1 is 50° C., the instantaneous electrical power $P_{\Delta t}$ of this photovoltaic panel 1 is 258 W, at an output voltage of the same photovoltaic panel 1 with value of 55 V and an output current of the first photovoltaic panel 1 being 4.7 A. The maximal possible charging voltage $U_{bat.}$ of the accumulator battery 4 in this exemplary embodiment of the invention is 23.1 V. With the necessary calculation of 5% of losses due to energy transformation, the optimal charging current $I_{opt.}$ with a magnitude of 10.6 A flows into the accumulator battery 4.

Figure 3:
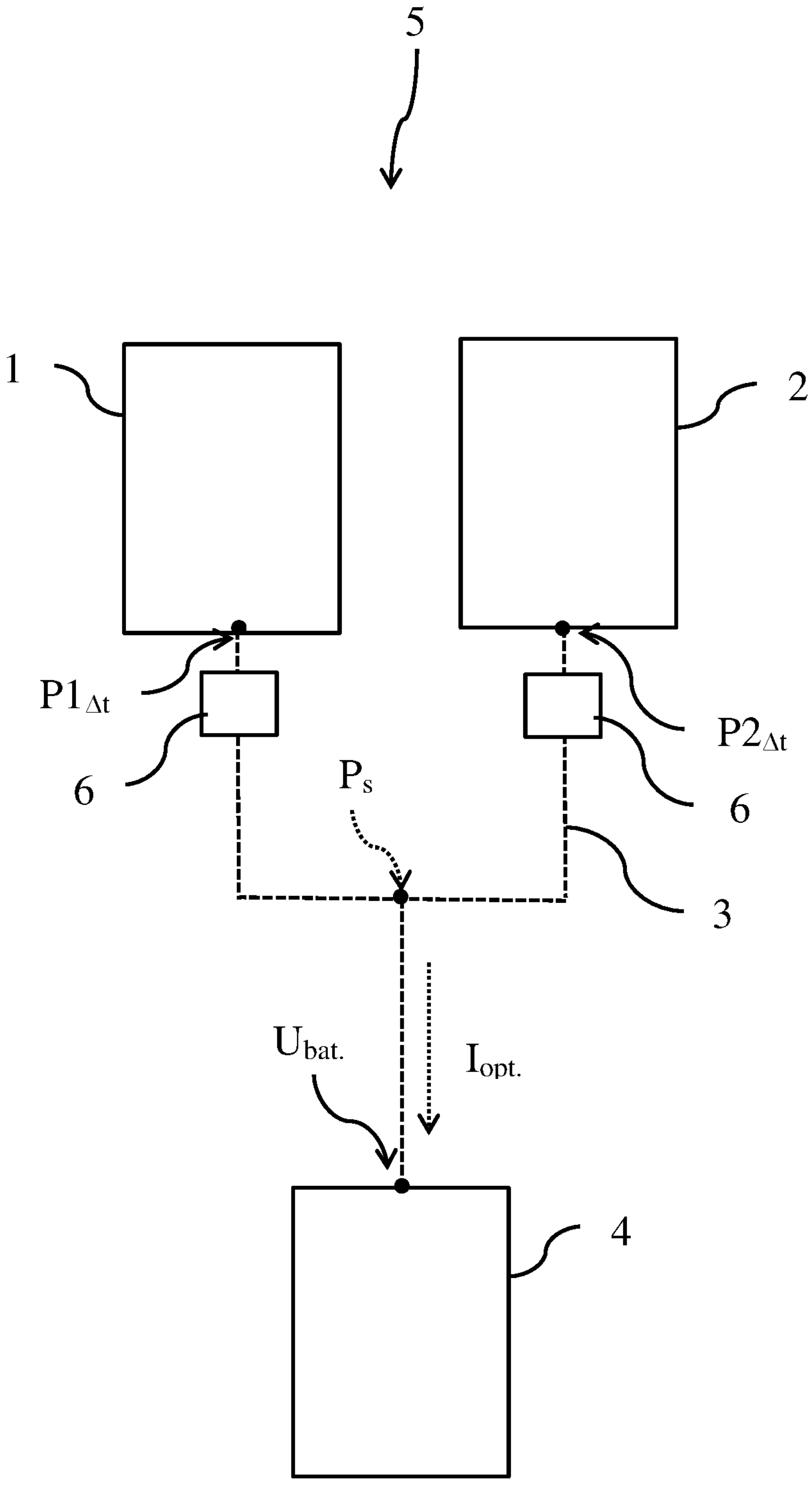
FIG. 3 a schematic illustration of a method of charging an accumulator battery when a system of two photovoltaic panels emitting different instantaneous electrical power at the same time is connected.

According to another exemplary embodiment of the invention, shown in FIGS. 2 and 3, at least two photovoltaic panels 1, 2 form a system 5 of photovoltaic panels 1, 2 generating continuously two instantaneous electrical powers $P1_{\Delta t}$, $P2_{\Delta t}$ at each point in time Δt. These two instantaneous electrical powers $P1_{\Delta t}$, $P2_{\Delta t}$ add up to the instantaneous electrical power $P_s$ of the system 5. In this preferred embodiment, the transformed optimal charging current $I_{opt.}$ is obtained by transforming the sum of these instantaneous electrical powers $P1_{\Delta t}$, $P2_{\Delta t}$ according to the formula $$I_{opt.} = \frac{P1_{\Delta t} + P2_{\Delta t}}{U_{bat.}} = \frac{P_s}{U_{bat.}}.$$

According to another exemplary embodiment of the invention, shown in FIGS. 2 and 3, the "i" number of photovoltaic panels 1, 2 of identical or different design performance forms the system 5 of photovoltaic panels 1, 2. This system 5 of photovoltaic panels 1, 2 continuously generates the instantaneous electrical power $P_s$ of the system 5 at each point in time Δt according to the formula $$P_s = \sum\nolimits_{i=1}^{n} Pi_{\Delta t}.$$

According to this preferred embodiment, the transformed optimal charging current $I_{opt.}$ is obtained from the equation $$I_{opt.} = \frac{\sum\nolimits_{i=1}^{n} Pi_{\Delta t}}{U_{bat.}} = \frac{P_s}{U_{bat.}}.$$

In ideal lighting conditions, it is theoretically possible to cause the two photovoltaic panels 1, 2 placed in the system 5 having identical production performance parameters generating the same instantaneous electrical power $P1_{\Delta t}$, $P2_{\Delta t}$ at a certain point in time Δt, when $P1_{66\ t}$=$P2_{\Delta t}$.

According to one non-illustrated exemplary embodiment of the invention generally based on FIG. 2, two identical first photovoltaic panels 1 are connected to the system 5, generating the same instantaneous electrical power $P1_{\Delta t}$, $P2_{\Delta t}$, when $P1_{\Delta t}$=$P2_{\Delta t}$. The first photovoltaic panels 1 are in the HIT N335 Wp design with a combined structure and the accumulator battery 4 is in the 48 V LiFePo4 160 Ah design in the 14S1P configuration. At an intensity of illumination of 800 W/m$^2$ and a temperature of the first photovoltaic panel 1 is 50° C., the instantaneous electrical power $P_{\Delta t}$ of each first photovoltaic panel 1 is 258 W, at an output voltage of the same photovoltaic panel 1 with value of 55 V and an output current of each first photovoltaic panel 1 being 4.7 A. The maximal possible charging voltage $U_{bat.}$ of the accumulator battery 4 in this exemplary embodiment of the invention is 46.2 V. With the necessary calculation of 5% of losses due to energy transformation, the optimal charging current $I_{opt.}$ with a magnitude of 5.3 A flows into the accumulator battery 4 from each first photovoltaic panel 1. The resulting optimal charging current $I_{opt.}$ flowing into the accumulator battery 4 from the two first photovoltaic panels 1 is thus 10.6 A.

According to another non-illustrated exemplary embodiment of the invention generally based on FIG. 3, two identical photovoltaic panels 1, 2 are connected to the system 5, generating different instantaneous electrical power $P1_{\Delta t}$, $P2_{\Delta t}$, when $P1_{\Delta t} \neq P2_{\Delta t}$. The reason for this fact is the difference in the intensity of illumination of individual photovoltaic panels 1, 2. The photovoltaic panels 1, 2 are in the HIT N335 Wp design with a combined structure and the accumulator battery 4 is in the 48 V LiFePo4 160 Ah design in the 14S1P configuration. At an intensity of illumination of the first photovoltaic panel 1 of 800 W/m$^2$ and a temperature of this photovoltaic panel 1 is 50° C., the instantaneous electrical power $P1_{\Delta t}$ of this photovoltaic panel 1 is 258 W, at an output voltage of this photovoltaic panel 1 with value of 55 V and an output current of this photovoltaic panel 1 being 4.7 A. At an intensity of illumination of the second photovoltaic panel 2 of 400 W/m$^2$ and a temperature of this photovoltaic panel 2 is 50° C., the instantaneous electrical power $P2_{\Delta t}$ of this photovoltaic panel 2 is 121 W, at an output voltage of this photovoltaic panel 2 with value of 55 V and an output current of this photovoltaic panel 2 being 2.2 A. The maximal possible charging voltage $U_{bat.}$ of the accumulator battery 4 in this exemplary embodiment of the invention is 46.2 V. With the necessary calculation of 5% of losses due to energy transformation, the optimal charging current $I_{opt.}$ with a magnitude of 5.3 A and 2.49 A flows into the accumulator battery 4 from the first photovoltaic panel 1 and from the second photovoltaic panel 2, respectively. The resulting optimal charging current $I_{opt.}$ Flowing into the accumulator battery 4 from both photovoltaic panels 1, 2 is thus 7.79 A.

According to another non-illustrated exemplary embodiment of the invention generally based on FIG. 3, two different photovoltaic panels 1, 2 are connected to the system 5, generating different instantaneous electrical power $\mathbf{P1}_{\Delta t}$, $\mathbf{P2}_{\Delta t}$, when $\mathbf{P1}_{\Delta t} \neq \mathbf{P2}_{\Delta t}$. The first photovoltaic panel 1 is in the HIT N335 Wp design with a combined structure and the second photovoltaic panel 2 is in the SL2-F 135 Wp design with a thin-film structure. The accumulator battery 4 is in the 48 V LiFePo4 160 Ah design in the 14S1P configuration. At an intensity of illumination of the first photovoltaic panel 1 of 800 W/m$^2$ and a temperature of this photovoltaic panel 1 is 50° C., the instantaneous electrical power $\mathbf{P1}_{\Delta t}$ of this photovoltaic panel 1 is 258 W, at an output voltage of this photovoltaic panel 1 with value of 55 V and an output current of this photovoltaic panel 1 being 4.7 A. At an intensity of illumination of the second photovoltaic panel 2 of 500 W/m$^2$ and a temperature of this photovoltaic panel 2 of 50° C., the instantaneous electrical power $\mathbf{P2}_{\Delta t}$ of this photovoltaic panel 2 is 56 W, at an output voltage of this photovoltaic panel 2 with value of 80 V and an output current of this photovoltaic panel 2 being 0.7 A. The maximal possible charging voltage $U_{bat.}$ of the accumulator battery 4 in this exemplary embodiment of the invention is 46.2 V. With the necessary calculation of 5% of losses due to energy transformation, the optimal charging current $I_{opt.}$ with a magnitude of 5.3 A and 1.15 A flows into the accumulator battery 4 from the first photovoltaic panel 1 and from the second photovoltaic panel 2, respectively. The resulting optimal charging current $I_{opt.}$ Flowing into the accumulator battery 4 from both photovoltaic panels 1, 2 is thus 6.45 A.

INDUSTRIAL APPLICABILITY

The invention can be used in the energy industry to obtain green electrical energy stored in accumulator batteries for later use or directly consumed by connected appliances, where the accumulator battery forms an optimizing energy element eliminating fluctuations in generated electrical energy during individual light phases of the day.

LIST OF INDEX REFERENCE NUMERALS

- 1 first photovoltaic panel
- 2 second photovoltaic panel
- 3 DC power line
- 4 accumulator battery
- 5 system of photovoltaic panels
- 6 converter
- $\Delta t$ point in time
- $P_s$ instantaneous electrical power of the system
- $P_{\Delta t}$ instantaneous electrical power at the given point in time
- $\mathbf{P1}_{\Delta t}$ instantaneous electrical power of the first photovoltaic panel
- $\mathbf{P2}_{\Delta t}$ instantaneous electrical power of the second photovoltaic panel
- $U_{bat.}$ maximum possible charging voltage
- $I_{opt.}$ optimal charging current
- $I_{max.}$ instantaneous maximal permissible charging current

The invention claimed is:

1. Method of charging at least one accumulator battery (4) from at least one photovoltaic panel (1, 2), where the photovoltaic panel (1, 2) generates an instantaneous electrical power ($P_{\Delta t}$) at each point in time ($\Delta$t), which is transformed into a charging current in the converter (6) connected to the photovoltaic panel (1, 2), which is transmitted via a DC power line (3) to at least one charged accumulator battery (4) for charging in, characterized in that:

a) the values of the instantaneous electrical power ($P_{\Delta t}$) of the photovoltaic panel (1, 2) and the maximum possible charging voltage ($U_{bat.}$) of the accumulator battery (4) are continuously monitored at each point in time ($\Delta$t), b) at each point in time ($\Delta$t), the instantaneous electrical power ($P_{\Delta t}$) of the photovoltaic panel (1, 2) is continuously transformed to the optimal charging current ($I_{opt.}$) according to the equation $$I_{opt.} = \frac{P_{\Delta t}}{U_{bat.}},$$

with this optimal charging current ($I_{opt.}$) being used to charge the accumulator battery (4), c) at each point in time ($\Delta$t), the instantaneous electrical power ($P_{\Delta t}$) of the photovoltaic panel (1, 2) is continuously adjusted to be maximum, but at the same the continuously transformed optimal charging current ($I_{opt.}$) meeting the conditions:

$$I_{opt.} = \frac{P_{\Delta t}}{U_{bat.}}$$

and concurrently $I_{opt.} \leq I_{max.}$, where $I_{max.}$ is the instantaneous maximal permissible charging current ($I_{max.}$), which can be safely absorbed by the accumulator battery (4) at point in time ($\Delta$t) during its charging cycle.

2. Method according to claim 1, characterized in that at least two photovoltaic panels (1, 2) form a system (5) of photovoltaic panels (1, 2), with these photovoltaic panels (1, 2) continuously generating two instantaneous electrical powers ($\mathbf{P1}_{\Delta t}$, $\mathbf{P2}_{\Delta t}$) at each point in time ($\Delta$t), added up to the instantaneous electric powers ($P_s$) of the system (5), where the transformed optimal charging current ($I_{opt.}$) is obtained by transforming the sum of these instantaneous electrical powers ($\mathbf{P1}_{\Delta t}$, $\mathbf{P2}_{\Delta t}$) according to the formula $$I_{opt.} = \frac{P1_{\Delta t} + P2_{\Delta t}}{U_{bat.}} = \frac{P_s}{U_{bat.}}.$$

3. Method according to claim 1, characterized in that the "i" number of photovoltaic panels (1, 2) of identical or different design performance forms a system (5) of photovoltaic panels (1, 2) continuously generating instantaneous electrical power ($P_s$) of the system (5) at each point in time ($\Delta$t) according to the formula $$P_s = \sum\nolimits_{i=1}^{n} Pi_{\Delta t},$$

where the transformed optimal charging current ($I_{opt.}$) is obtained from the equation $$I_{opt.} = \frac{\sum_{i=1}^{n} Pi_{\Delta t}}{U_{bat.}} = \frac{P_s}{U_{bat.}}.$$

4. Method according to claim 2, characterized in that the "i" number of photovoltaic panels (1, 2) of identical or different design performance forms a system (5) of photovoltaic panels (1, 2) continuously generating instantaneous electrical power ($P_s$) of the system (5) at each point in time ($\Delta$t) according to the formula $$P_s = \sum_{i=1}^{n} Pi_{\Delta t},$$

where the transformed optimal charging current ($I_{opt.}$) is obtained from the equation $$I_{opt.} = \frac{\sum_{i=1}^{n} Pi_{\Delta t}}{U_{bat.}} = \frac{P_s}{U_{bat.}}.$$

* * * * *